US011151152B2

(12) United States Patent
Krupa et al.

(10) Patent No.: US 11,151,152 B2
(45) Date of Patent: Oct. 19, 2021

(54) CREATING MAPPINGS BETWEEN RECORDS IN A DATABASE TO NORMALIZED QUESTIONS IN A COMPUTERIZED DOCUMENT

(71) Applicant: Microsoft Technology Licensing, LLC, Redmond, WA (US)

(72) Inventors: Wojciech Krupa, Cupertino, CA (US); Evan Alexander Owski, San Francisco, CA (US); Timothy Jack Showalter, Newark, CA (US); Gordon Wintrob, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1306 days.

(21) Appl. No.: 15/056,801

(22) Filed: Feb. 29, 2016

(65) Prior Publication Data

US 2017/0249371 A1    Aug. 31, 2017

(51) Int. Cl.
*G06F 16/25* (2019.01)
*G06N 20/00* (2019.01)
*G06F 16/23* (2019.01)
*G06F 16/9535* (2019.01)
*G06Q 10/10* (2012.01)

(52) U.S. Cl.
CPC ........ *G06F 16/258* (2019.01); *G06F 16/2365* (2019.01); *G06F 16/9535* (2019.01); *G06N 20/00* (2019.01); *G06Q 10/10* (2013.01)

(58) Field of Classification Search
CPC .... G06N 20/00; G06Q 10/10; G06F 16/2365; G06F 16/258
See application file for complete search history.

(56) References Cited

U.S. PATENT DOCUMENTS 6,502,086 B2 * 12/2002 Pratt .................... G06F 16/2219
6,584,464 B1 * 6/2003 Warthen .............. G06F 16/3334
6,826,540 B1 * 11/2004 Plantec ................. G06Q 30/02
705/7.32

(Continued)

FOREIGN PATENT DOCUMENTS

WO    WO-2005101978 A2 * 11/2005 ......... H04L 63/0421
WO    WO-2013078399 A1 *  5/2013 ........... G06Q 10/105

OTHER PUBLICATIONS

Abler et al., "Models for Forms", SPLASH'11 Workshops (2011). (Year: 2011).*

(Continued)

*Primary Examiner* — Alexey Shmatov
*Assistant Examiner* — Beatriz Ramirez Bravo
(74) *Attorney, Agent, or Firm* — Schwegman Lundberg & Woessner, P.A.

(57) ABSTRACT

In an example embodiment, a solution that creates a questionnaire mapping record for questions in a computerized document is utilized to map questions in the computerized document to normalized questions. Where necessary, normalized questions can be automatically created and included in the questionnaire mapping record. Handing strategy rules may also be automatically created for the normalized question, with the handling strategy rules defining how data may be automatically retrieved and used to prepopulate answers to the questions in the computerized document.

20 Claims, 14 Drawing Sheets

(56) References Cited

U.S. PATENT DOCUMENTS

| | | | |
|---|---|---|---|
| 8,600,931 B1* | 12/2013 | Wehrle | G06F 16/9535 |
| | | | 707/607 |
| 2001/0052009 A1* | 12/2001 | Desai | H04L 67/42 |
| | | | 709/224 |
| 2003/0069880 A1* | 4/2003 | Harrison | G06F 16/3334 |
| 2004/0083199 A1 | 4/2004 | Govindugari et al. | |
| 2005/0043998 A1* | 2/2005 | Bross | G06Q 20/207 |
| | | | 705/19 |
| 2007/0111190 A1 | 5/2007 | Cohen et al. | |
| 2007/0192688 A1* | 8/2007 | Vasey | G06F 17/24 |
| | | | 715/210 |
| 2008/0091846 A1* | 4/2008 | Dang | G06Q 10/10 |
| | | | 709/246 |
| 2009/0117529 A1* | 5/2009 | Goldstein | G06Q 30/02 |
| | | | 434/350 |
| 2011/0066464 A1* | 3/2011 | George | G06Q 30/02 |
| | | | 705/7.32 |
| 2012/0089546 A1* | 4/2012 | Ahmed | G06F 17/2785 |
| | | | 706/45 |
| 2014/0122410 A1* | 5/2014 | Ludlow | G06F 3/0482 |
| | | | 706/59 |
| 2014/0280067 A1 | 9/2014 | Ganti et al. | |
| 2014/0337320 A1* | 11/2014 | Hernandez | G06F 16/2428 |
| | | | 707/722 |
| 2015/0006422 A1 | 1/2015 | Carter et al. | |
| 2017/0091331 A1* | 3/2017 | Tober | G06F 16/9535 |

OTHER PUBLICATIONS

Wang et al., "A Rule Repository Model for Rule-Driven Question-Answer-Based Web Applications", IEEE, (2010). (Year: 2010).*

"Final Office Action Issued in U.S. Appl. No. 15/056,757", dated Aug. 21, 2019, 41 Pages.

"Non Final Office Action Issued in U.S. Appl. No. 15/056,757", dated Jan. 28, 2019, 32 pages.

"Appeal Brief filed in U.S. Appl. No. 15/056,790", filed Feb. 3, 2020, 34 Pages.

"Decision on Pre-Appeal Brief Request Issued in U.S. Appl. No. 15/056,790", dated Jan. 3, 2020, 02 Pages.

"Final Office Action Issued in U.S. Appl. No. 15/056,790", dated May 10, 2019, 53 Pages.

"Non Final Office Action Issued in U.S. Appl. No. 15/056,790", dated Nov. 16, 2018, 43 Pages.

"Non Final Office Action Issued in U.S. Appl. No. 15/056,790", dated Aug. 21, 2019, 54 Pages.

"Notice of Non-Compliant Appeal Brief Issued in U.S. Appl. No. 15/056,790", dated Feb. 13, 2020, 02 Pages.

"Pre-Appeal Brief Request filed in U.S. Appl. No. 15/056,790", filed Nov. 7, 2019, 06 Pages.

* cited by examiner

| NORMALIZED QUESTION RECORD 400 | | | |
|---|---|---|---|
| IDENTIFICATION FIELD 402 | QUESTION TEXT FIELD 404 | ANSWER DETAIL FIELD 406 | HANDLING STRATEGY FIELD 408 |
| SECTION FIELD 410 | ORDERING FIELD 412 | ASK ONLY IF FIELD 414 | ASK UNLESS FIELD 416 |

*FIG. 4*

| QUESTIONNAIRE MAPPING RECORD 600 | | |
|---|---|---|
| QUESTION RECORD 602A | | |
| NORMALIZED QUESTION RECORD IDENTIFICATION FIELD 604 | QUESTIONNAIRE QUESTION IDENTIFICATION FIELD 606 | DATA TRANSFORMATION FIELD 608 |
| QUESTION RECORD 602B | | |
| NORMALIZED QUESTION RECORD IDENTIFICATION FIELD 604 | QUESTIONNAIRE QUESTION IDENTIFICATION FIELD 606 | DATA TRANSFORMATION FIELD 608 |
| QUESTION RECORD 602C | | |
| NORMALIZED QUESTION RECORD IDENTIFICATION FIELD 604 | QUESTIONNAIRE QUESTION IDENTIFICATION FIELD 606 | DATA TRANSFORMATION FIELD 608 |

*FIG. 6*

| HANDLING STRATEGY FIELD 404 |
|---|
| RETRIEVE INFORMATION FROM LAST NAME FIELD FROM SOCIAL NETWORKING PROFILE CORRESPONDING TO MEMBER 800 |
| CHECK NUMBER OF CHARACTERS IN RETRIEVED INFORMATION AND TRUNCATE TO 20 CHARACTERS 802 |
| CHECK SPELLING OF RETRIEVED INFORMATION AGAINST NAMES DATABASE, IF ERROR OCCURS PROMPT FOR VALIDATION 804 |
| IF DATA RETRIEVAL IS UNSUCCESSFUL, SEE IF FRONT-END SAVED PREVIOUS ANSWER 806 |
| IF FRONT-END DID NOT SAVE PREVIOUS ANSWER, CAUSE FRONT-END TO PROMPT MEMBER DIRECTLY FOR ANSWER 808 |

*FIG. 8*

CREATING MAPPINGS BETWEEN RECORDS IN A DATABASE TO NORMALIZED QUESTIONS IN A COMPUTERIZED DOCUMENT

TECHNICAL FIELD

The present disclosure generally relates to computer technology for solving technical challenges in electronic communications. More specifically, the present disclosure relates to the creating of mappings between records in a database in order to normalize questions in a computerized document.

BACKGROUND

The rise of the Internet has given rise to two disparate phenomena: the increase in the presence of social networks, with their corresponding member profiles visible to large numbers of people, and the increase in advertising for job openings. When a member of a social network views an advertisement for a job opening, there is often contact information in the advertisement directing the member as to how to apply for the job. This may be simple contact information, such as a phone number to call or an email address to which to send a resume, or may be more complex, such as a link to an online questionnaire that the member fills out to provide more information to the company having the job opening.

For online questionnaires in such environments, oftentimes the questionnaires from the different companies' advertisements will ask many of the same questions, albeit in different ways. For example, nearly all such questionnaires want basic information such as the applicant's name, address, contact information, and the like, although sometimes these are requested in different ways (e.g., for name there may be a field titled "first name" and a field titled "last name," or their may be a field titled "first name" and a field titled "surname," middle names may be requested either in full or in abbreviated form, titles, such as Jr. or Sr. may or may not be requested, etc.) There may also be more complex information that many companies will ask, such as immigration status (e.g., are you a U.S. citizen? Do you have a green card? Are you here on a work visa? Do you need a sponsor). Additionally, there may be questions unique to the company or job at hand.

These questionnaires can take a long time for a user to complete, resulting in some members not applying for jobs they might ordinarily have applied for. For example, a member may be on the fence about whether to apply for a job, and when encountering a questionnaire that will take an hour or two to complete, the member may simply decide not to apply. Another example is a member who does want to apply for a job, but simply cannot find the time to spend filling out the questionnaire and the job gets filled before the member finds the time. These problems are amplified on mobile devices. Recently, the number of people applying for jobs using a mobile device such as a smartphone has risen dramatically. A questionnaire, however, that might have taken 20 minutes to fill out on a laptop or desktop computer could take 3 hours on a mobile device due to the difficulty in typing and navigating on a mobile device. Some questionnaires are actually hosted on sites requiring that the user separately register for an account in order to even begin to fill out the questionnaire.

It is desirable for a solution that would reduce the amount of time it takes to fill out an online questionnaire, especially on mobile devices, by prepopulating many or all of the fields of information. Such a solution, however, presents many technical problems.

First of all, there is the technological problem of how to obtain the information that is going to be used to prepopulate the fields of the questionnaires. While some information may be gleaned from a member profile in the social networking service, this information may be incomplete. Additionally, certain types of information may not be available in social networking service profiles. For example, while it is common for a member to enter his or her name in a social networking service profile, it is not common for a member to enter his or her immigration status in a social networking profile.

Second of all, there is the technological problem of dealing with different formats of questionnaires. Each questionnaire may ask the same or a similar question in a different way, and the format that each questionnaire is expecting a response in may also differ between questionnaires. For example, one questionnaire may ask for "work experience" and request a list of companies worked for, and the years in which the member worked for them, while another questionnaire may ask for "work history" and request a list of companies worked for, and both the months and years in which the member worked for them.

BRIEF DESCRIPTION OF THE DRAWINGS

Some embodiments of the technology are illustrated, by way of example and not limitation, in the figures of the accompanying drawings.

FIG. 4 is a diagram illustrating a normalized question record, in accordance with an example embodiment.

FIG. 6 is a diagram depicting a questionnaire mapping record, in accordance with an example embodiment.

FIG. 8 is a diagram illustrating example rules in a handling strategy field, in accordance with an example embodiment.

DETAILED DESCRIPTION

Overview

The present disclosure describes, among other things, methods, systems, and computer program products that individually provide functionality for speeding data access. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a platform is provided that allows for automatic prepopulating of fields of a questionnaire for a job application. This platform may contain numerous components, which collectively may be known as the "easy apply" system. Questions from different questionnaires may be normalized into a single version of the question. These normalized questions may be stored in a data object in a database. Upon detecting an indication from a member of a social networking service, the normalized questions may be retrieved from the database and used to automatically extract information related to the normalized questions from the member's social networking profile, as well as extract information related to the normalized questions from other sources. This information may then be used to automatically prepopulate fields in the exact questionnaire corresponding to the job for which the member is interested in applying.

Figure 1:
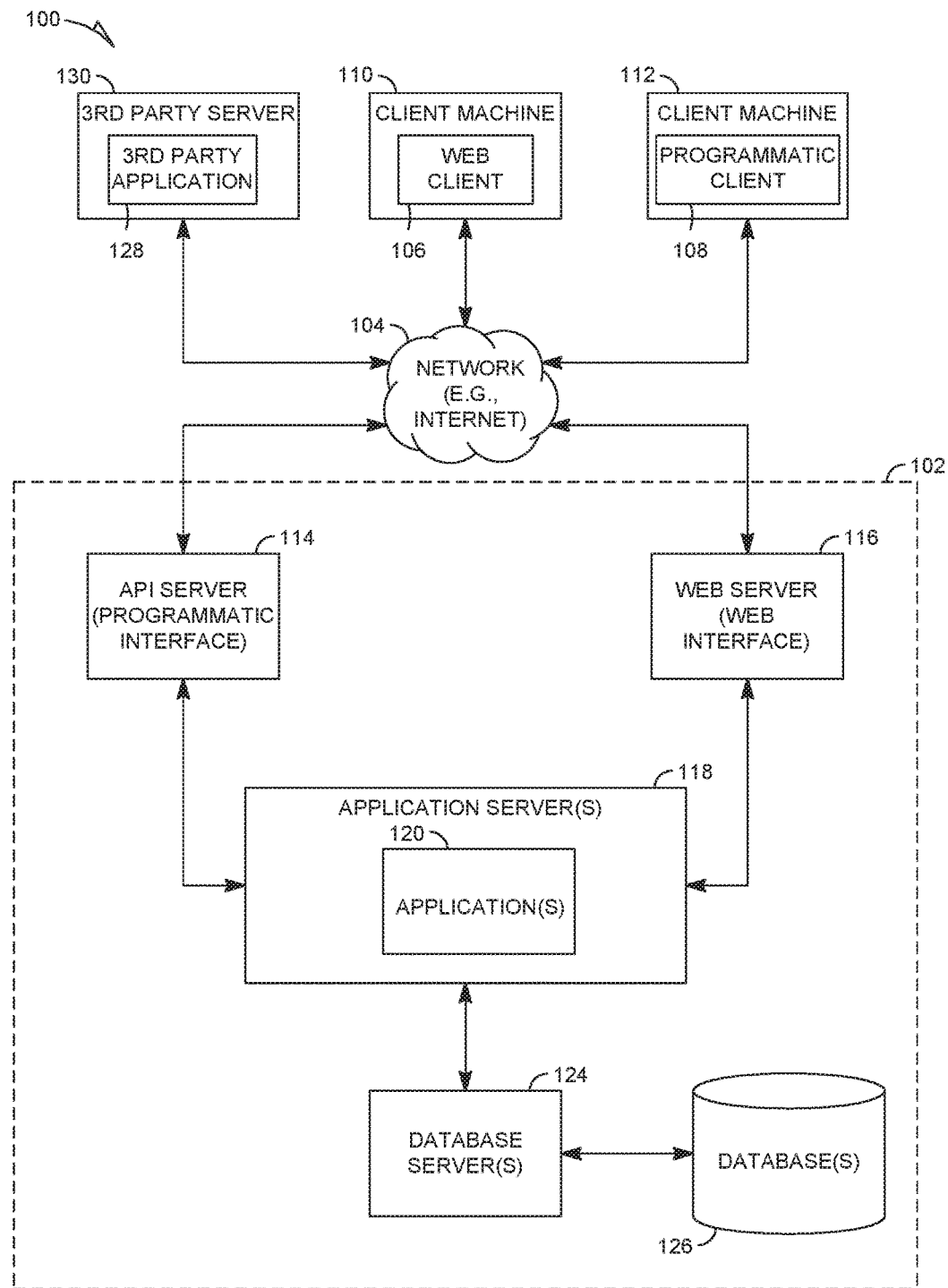
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or a wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more databases 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server 130, as having programmatic access to the networked system 102 via the programmatic interface provided by the API server 114. For example, the third party application 128 may, utilizing information retrieved from the networked system 102, support one or more features or functions on a website hosted by a third party. The third party website may, for example, provide one or more functions that are supported by the relevant applications 120 of the networked system 102.

In some embodiments, any website referred to herein may comprise online content that may be rendered on a variety of devices including, but not limited to, a desktop personal computer (PC), a laptop, and a mobile device (e.g., a tablet computer, smartphone, etc.). In this respect, any of these devices may be employed by a user to use the features of the present disclosure. In some embodiments, a user can use a mobile app on a mobile device (any of the machines 110, 112 and the third party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
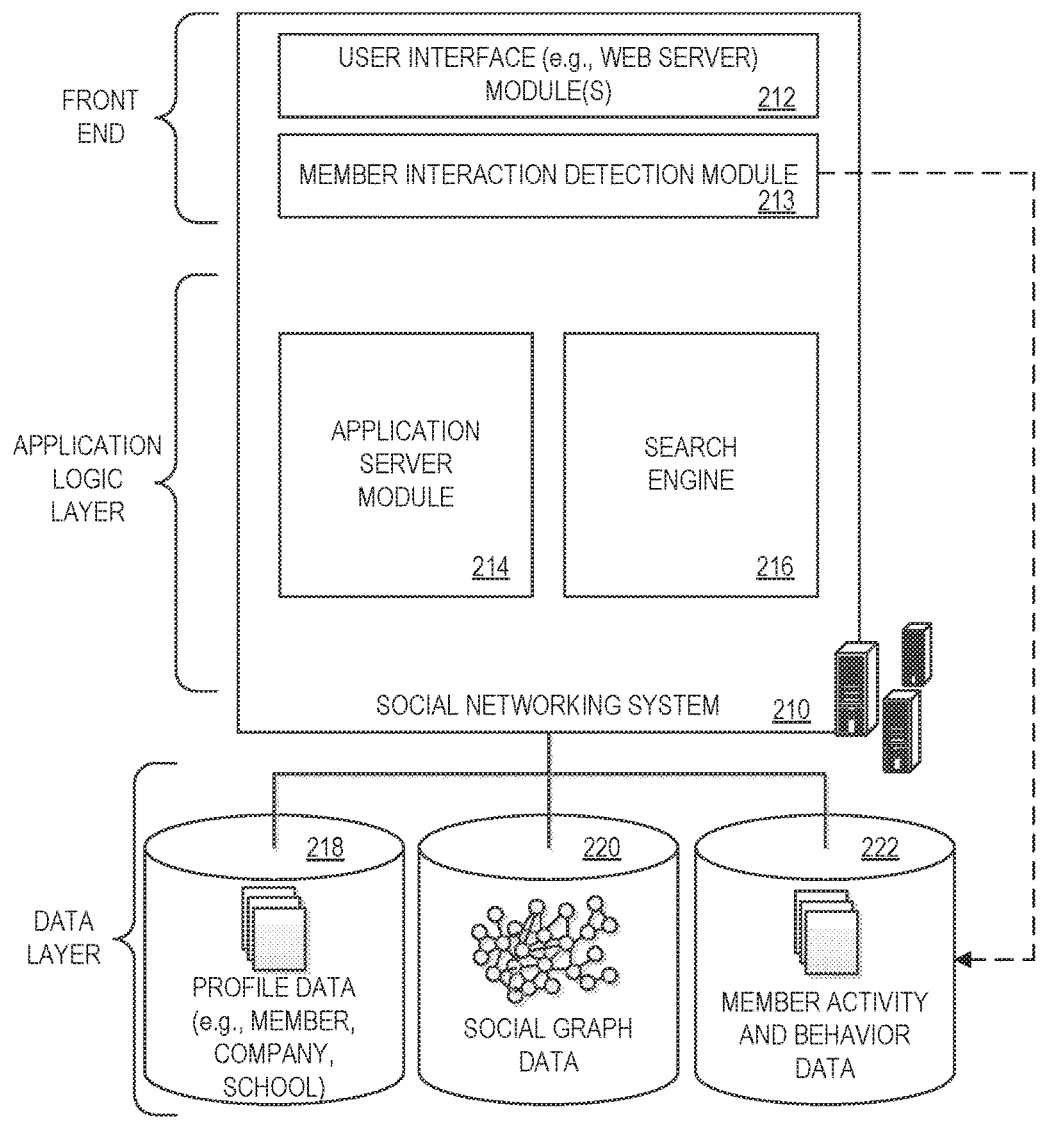
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on the application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transfer Protocol (HTTP) requests or other web-based API requests. In addition, a member interaction detection module 213 may be provided to detect various interactions that members have with different applications 120, services, and content presented. As shown in FIG. 2, upon detecting a particular interaction, the member interaction detection module 213 logs the interaction, including the type of interaction and any metadata relating to the interaction, in a member activity and behavior database 222.

An application logic layer may include one or more various application server modules 214, which, in conjunction with the user interface module(s) 212, generate various user interfaces (e.g., web pages) with data retrieved from various data sources in a data layer. In some embodiments, individual application server modules 214 are used to implement the functionality associated with various applications 120 and/or services provided by the social networking service.

As shown in FIG. 2, the data layer may include several databases, such as a profile database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 218. Similarly, when a representative of an organization initially registers the organization with the social networking service, the representative may be prompted to provide certain information about the organization. This information may be stored, for example, in the profile database 218, or another database (not shown). In some embodiments, the profile data may be processed (e.g., in the background or offline) to generate various derived profile data. For example, if a member has provided information about various job titles that the member has held with the same organization or different organizations, and for how long, this information can be used to infer or derive a member profile attribute indicating the member's overall seniority level, or seniority level within a particular organization. In some embodiments, importing or otherwise accessing data from one or more externally hosted data sources may enrich profile data for both members and organizations. For instance, with organizations in particular, financial data may be imported from one or more external data sources and made part of an organization's profile. This importation of organization data and enrichment of the data will be described in more detail later in this document.

Once registered, a member may invite other members, or be invited by other members, to connect via the social networking service. A "connection" may constitute a bilateral agreement by the members, such that both members acknowledge the establishment of the connection. Similarly, in some embodiments, a member may elect to "follow" another member. In contrast to establishing a connection, the concept of "following" another member typically is a unilateral operation and, at least in some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in a social graph database 220.

As members interact with the various applications 120, services, and content made available via the social networking service, the members' interactions and behavior (e.g.,
content viewed, links or buttons selected, messages responded to, etc.) may be tracked, and information concerning the members' activities and behavior may be logged or stored, for example, as indicated in FIG. 2, by the member activity and behavior database 222. This logged activity information may then be used by the search engine 216 to determine search results for a search query.

In some embodiments, the databases 218, 220, and 222 may be incorporated into the database(s) 126 in FIG. 1. However, other configurations are also within the scope of the present disclosure.

Although not shown, in some embodiments, the social networking service system 210 provides an API module via which applications 120 and services can access various data and services provided or maintained by the social networking service. For example, using an API, an application may be able to request and/or receive one or more navigation recommendations. Such applications 120 may be browser-based applications 120, or may be operating system-specific. In particular, some applications 120 may reside and execute (at least partially) on one or more mobile devices (e.g., phone or tablet computing devices) with a mobile operating system. Furthermore, while in many cases the applications 120 or services that leverage the API may be applications 120 and services that are developed and maintained by the entity operating the social networking service, nothing other than data privacy concerns prevents the API from being provided to the public or to certain third parties under special arrangements, thereby making the navigation recommendations available to third party applications 128 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when member profiles are indexed, forward search indexes are created and stored. The search engine 216 facilitates the indexing and searching for content within the social networking service, such as the indexing and searching for data or information contained in the data layer, such as profile data (stored, e.g., in the profile database 218), social graph data (stored, e.g., in the social graph database 220), and member activity and behavior data (stored, e.g., in the member activity and behavior database 222). The search engine 216 may collect, parse, and/or store data in an index or other similar structure to facilitate the identification and retrieval of information in response to received queries for information. This may include, but is not limited to, forward search indexes, inverted indexes, N-gram indexes, and so on.

Figure 3:
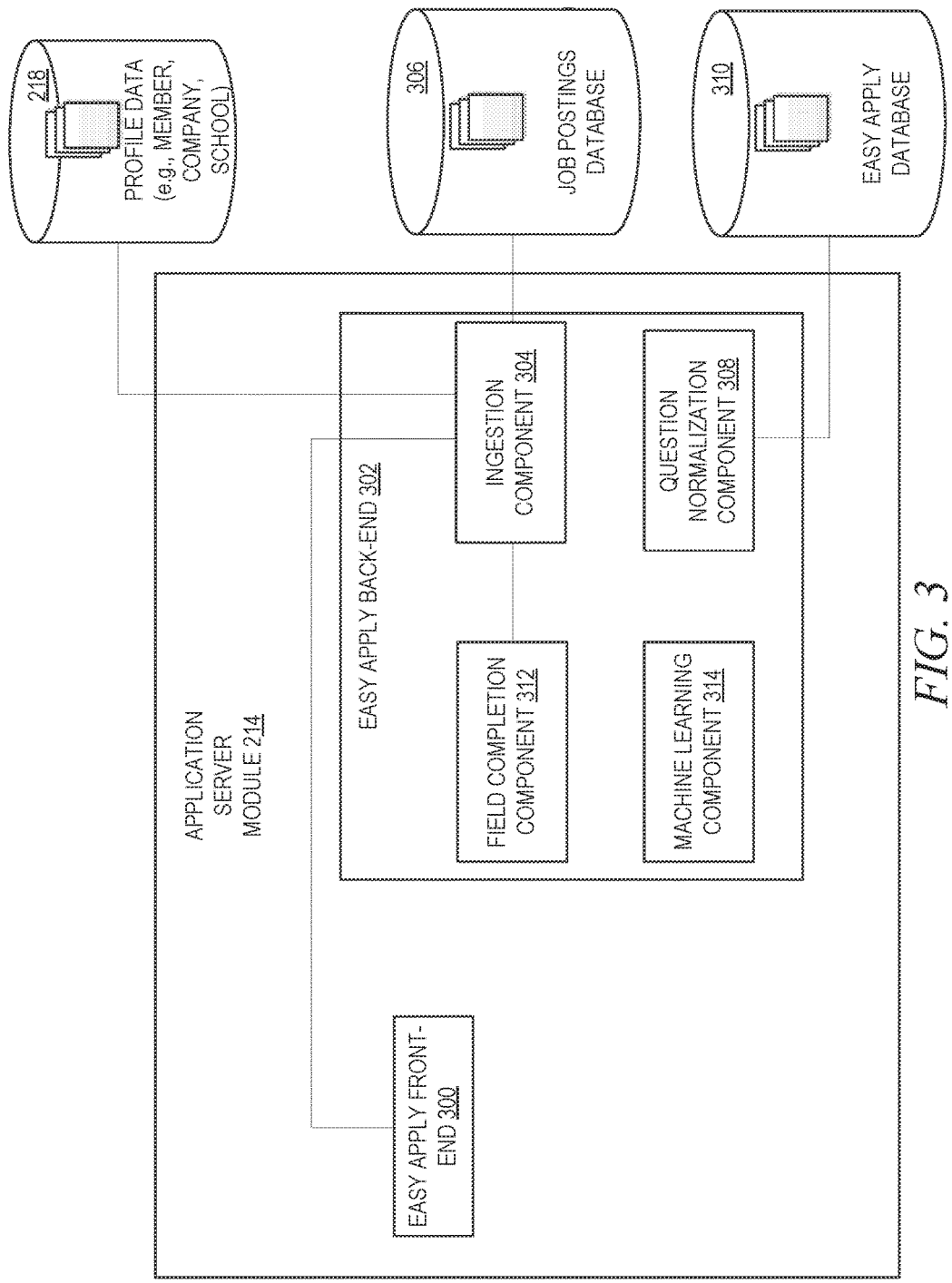
FIG. 3 is a block diagram illustrating an application server module of FIG. 2 in more detail, in accordance with an example embodiment.

FIG. 3 is a block diagram illustrating application server module 214 of FIG. 2 in more detail. While in many embodiments the application server module 214 will contain many subcomponents used to perform various different actions within the social networking system, in FIG. 3 only those components that are relevant to the present disclosure are depicted. An easy apply front-end 300 may interact with a member in order to facilitate the easy apply process. This facilitation will be described in more detail later, but generally involves providing a user interface through which the member reviews and approves of personal information being used to prepopulate one or more questionnaires, as well as provides a mechanism by which data input by a member to complete a questionnaire or one or more normalized questions is recorded for later use in a subsequent questionnaire.

An easy apply back-end 302 may interact with the easy apply front-end 300 and provide data to the easy apply front-end 300 as well as receive data and other input from the easy apply-front end 300. The easy apply back-end 302 may include an ingestion component 304, which acts to obtain information needed by the easy apply back-end 302 to perform various processes related to the easy apply process. The ingestion component 304 may obtain question information from questionnaires identified or stored in a job postings database 306. This question information may include unique questions, generic questions, and semi-generic questions. Unique questions are questions that are unique to a particular questionnaire, in both syntax and meaning. This means that the unique questions are not requesting the same information as questions from other questionnaires. An example of a unique question is one that asks the member about the member's familiarity with a specific product of the company to which the job applies. Generic questions are questions that are generic to multiple questionnaires, in both syntax and meaning. A generic question is one that requests the same information in the same format, and is itself stated in the same way, as another question from another questionnaire. An example of a generic question is "Are you a U.S. citizen?" A semi-generic question is one that requests the same information, but potentially in a different format and potentially stated in a different way, as another question from another questionnaire. Thus, "last name" may be a semi-generic question because it requests the same information as another question from another questionnaire (the member's name), but may be requesting it in a different manner (e.g., the other questionnaire asks it by asking for "surname"). It will be recognized that the line between generic questions and semi-generic questions may be blurred in that there may always be the possibility that some questionnaire somewhere will word a question in a different way than another questionnaire, and thus to some extent all generic questions may be thought of as semi-generic.

A question normalization component 308 may obtain the question information obtained by the ingestion component 304 and form a set of normalized questions from the semi-generic questions contained therein. The normalized questions each represent the canonical version of the question, even though the semi-generic questions associated with each normalized questions may themselves take different forms. For example, "last name" and "surname" may both be normalized to "last name." Each normalized question may then be stored in the easy apply database 310 Other information may also be stored along with each normalized question, including whether the question is mandatory, the format in which the answers to the normalized question are stored, and dependency information, all of which will be described in more detail below.

The ingestion component 304 may then also provide the question information to a field completion component 312 The job of the field completion component 312 is to automatically prepopulate one or more fields in a questionnaire. In order to perform this job, the ingestion component 304 may provide additional information to the field completion component 312. This additional information includes profile information about a member from the profile database 218, as well as information obtained from the easy apply front-end 300, including, but not limited to, information entered previously by the member into the easy apply front-end 300. The process of automatic field completion by the field completion component 312 and its subsequent interactions with the easy apply front-end 300 will be described in more detail below.

A machine learning component 314 may also be provided as part of the easy apply back-end. The machine learning component 314 may perform multiple different tasks. In some example embodiments, the machine learning component 314 is used together with the question normalization component 308 to allow the easy apply back-end 302 to automatically normalize questions. In some example embodiments, the machine learning component 314 is used together with the field completion component 312 to allow the easy apply back-end 302 to automatically map information relevant to answers to the normalized questions to corresponding fields in individual questionnaires. Of course, in some embodiments, both aspects are used. All of these aspects will be described in more detail below.

Referring back to the question normalization component 308, this component acts to normalize generic or semi-generic questions from questionnaires into a normalized question record. FIG. 4 is a diagram illustrating a normalized question record 400, in accordance with an example embodiment. Each normalized question may have an associated normalized question record 400. In some example embodiments, the normalized question record may be stored as a binary large object (BLOB). The normalization record may include an identification field 402 that uniquely identifies the normalized question. A question text field 404 may include the actual text of the normalized question. An answer detail field 406 may be used to specify various characteristics of the answers permitted for the normalized question, such as multiple choice answers, text limits, and the like. A handling strategy field 408 includes a handling strategy as to how to save the answer to the normalized question. This may include strategies such as reformatting pieces of data in the answer to match data type fields in various questionnaires. It should be noted that the handling strategy field 408 describes strategies for handling answers given to the normalized questions and where to store such answers. A separate process and field, as described below, will be used to map these answers to normalized questions to specific questions in particular questionnaires (and handle any data type manipulation and/or formatting used in doing so). As will be described in more detail below, the handling strategy field 408 may include various rules for determining where to extract data from and how to handle such data in order to prepopulate an answer to the normalized question.

A section field 410 may indicate a section in a list of normalized questions in which this particular normalized question belongs. An ordering field 412 indicates a particular location in which the particular question belongs. This allows the normalized questions to maintain an ordering, even within particular sections. An optional expiration field (not shown) may specify an expiration date for a saved answer to this normalized question. This may be most useful for normalized questions that ask for information that may become quickly stale, such as immigration status.

An ask only if field 414 and an ask unless field 416 may be used to create dependencies between normalized question. The ask only if field 414 may contain an identification of another normalized question which, if answered true by an applicant, causes the normalized question pertaining to the normalized question record 400 to be asked. The ask unless field 416 may contain an identification of another normalized question which, if answered false by an applicant, causes the normalized question pertaining to the normalized question record 400 to be asked. It should be noted that in an alternative embodiment, an ask when field (not pictured) may be utilized rather than the ask only if field 414 and ask unless field 416. The ask when field specifies both the prerequisite question and the required answer.

The normalized question records 400 may be stored in the easy apply database 310.

Figure 5:
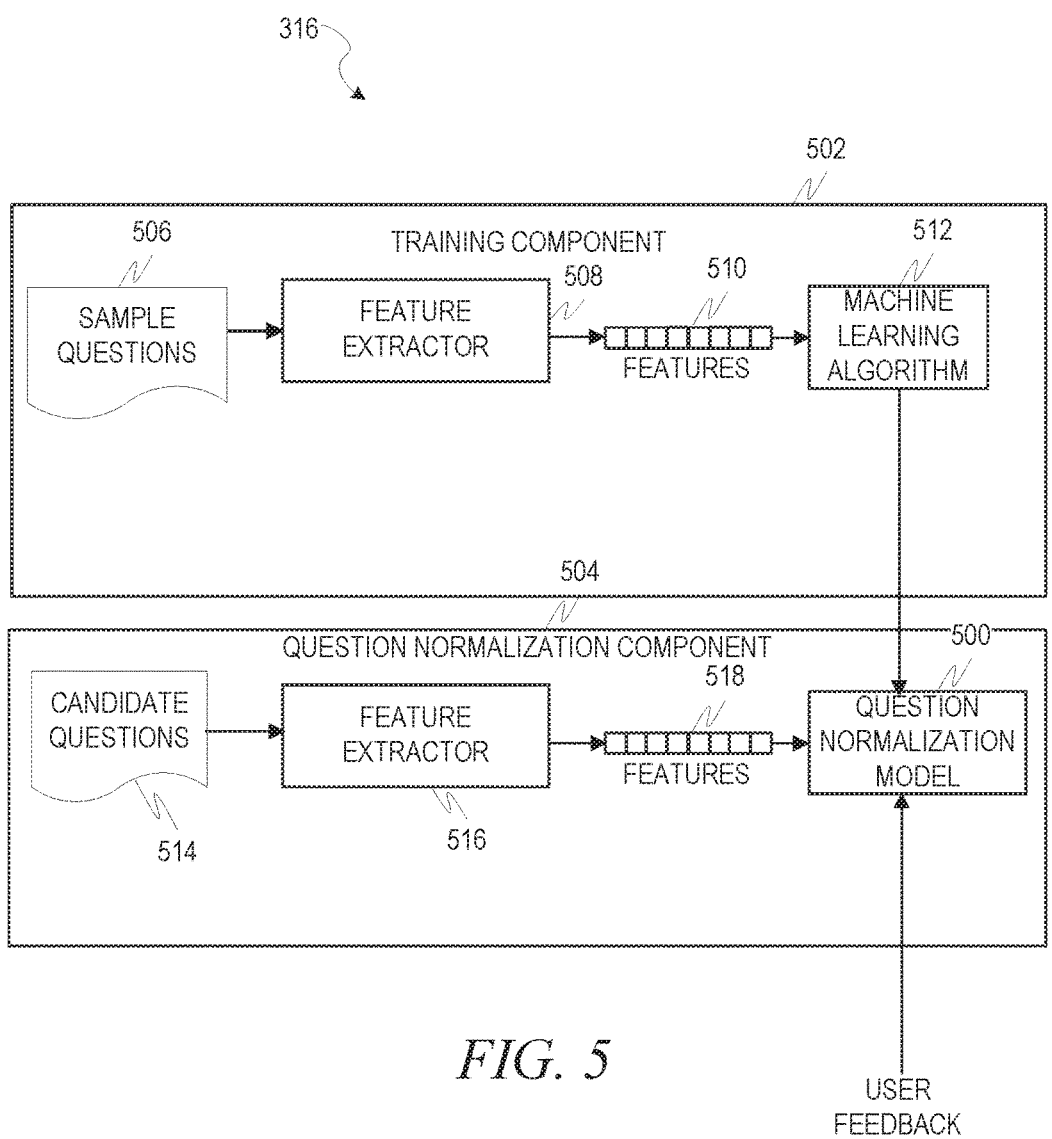
FIG. 5 is a block diagram illustrating a machine learning component used to automatically create information in a normalized question record, in accordance with an example embodiment.

In some example embodiments, the information stored in a normalized question record 400 may be automatically created by the machine learning component 314. FIG. 5 is a block diagram illustrating a machine learning component 314 used to automatically create information in a normalized question record 400 in accordance with an example embodiment. The machine learning component 314 may utilize machine learning processes to arrive at a question normalization model 500 used to automatically create normalized question information from raw format questionnaire questions. The machine learning component 314 may comprise a training component 502 and a question normalization component 504. The training component feeds sample questions 506 from sample questionnaires into a feature extractor 508 that extracts one or more features 510 for the sample questions 506. The sample questions 506 may each include a label indicating a normalized version of the sample question. The features 510 are measurements useful in differentiating questions from one another and/or finding common ground in different questions. For example, the features 510 may include, for each sample question, HyperText Markup Language (HTML) element attributes such as class ID, label, and tag type. The features 510 are then fed into a machine learning algorithm 512, which acts to interpret the features as well as one or more labels provided by human administrators to learn how to identify which features of a question are relevant to determining a normalized version of the question. The machine learning algorithm 512 produces the question normalization model 500. In the question normalization component 504, candidate questions 514 from questionnaires are fed to a feature extractor 516 that extracts one or more features 518 from the candidate questions 514. In an example embodiment, features 518 are identical to the features 510, although the values for the features will of course vary based on the questions. These features 518 are then fed to the question normalization model, which outputs a created normalized question record 400 based on the model.

It should be noted that the question normalization model 500 may be periodically updated via additional training and/or user feedback. The user feedback may be either feedback from entities supplying the questionnaires (e.g., companies posting the job and preparing the questionnaires for members to complete), or from the members themselves. The feedback may include an indication about how successful the question normalization model 500 is in creating normalized questions from questionnaire questions.

The machine learning algorithm 512 may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method.

At runtime, the field completion component 312 may retrieve the normalized question records 400 from the easy apply database 310 and attempt to automatically complete answers to the normalized questions contained in the normalized question records 400 using information from the ingestion component 304. In doing so, two different types of information may be utilized. The first is a mapping between normalized question(s) and questionnaire question(s). FIG. 6 is a diagram depicting a questionnaire mapping record 600, in accordance with an example embodiment. A different questionnaire mapping record 600 may be stored for each different questionnaire encountered by the field completion component 312. The questionnaire mapping record 600 provides a mapping between questions in the corresponding questionnaire and normalized question records 400. In other words, the questionnaire mapping record 600 may contain information about which questions in the corresponding questionnaire have a corresponding normalized question in the easy apply database 310. The questionnaire mapping record 600 may actually comprise a series of smaller records (one for each question being mapped). In the example questionnaire mapping record 600 in FIG. 6, this is depicted as question records 602A-602C. Each question record 602A-602C may include an identification field 604 identifying a normalized question record 400, an identification field 606 identifying a questionnaire question, and a data transformation field 608. The presence of an identification of a particular normalized question record 400 in identification field 604 and the presence of an identification of a particular questionnaire question in identification field 606 indicates that there is a correlation between the two. The data transformation field 608 identifies one or more data transformation rules for use when the mapping is leveraged to transfer answers to normalized questions to answers for the questionnaire questions. For example, a questionnaire question may be "Surname?" while a corresponding normalized question is "Last Name," Thus, in a question record 602A-602C corresponding to this mapping, an identification of the normalized "Last Name" question will be stored in identification field 604, and an identification of the questionnaire "Surname?" question will be stored in identification field 606. If, for example, the questionnaire prefers the answer to be in all caps in response to the "Surname?" question while the normalized "Last Name" question permits either upper or lowercase characters, a data transformation rule may be placed in data transformation field 608 indicating that any lowercase character be transformed to an uppercase equivalent. This will allow an answer to the normalized question "Last Name" to meet the parameters provided by the questionnaire question "Surname?" without crashing the process.

Figure 7:
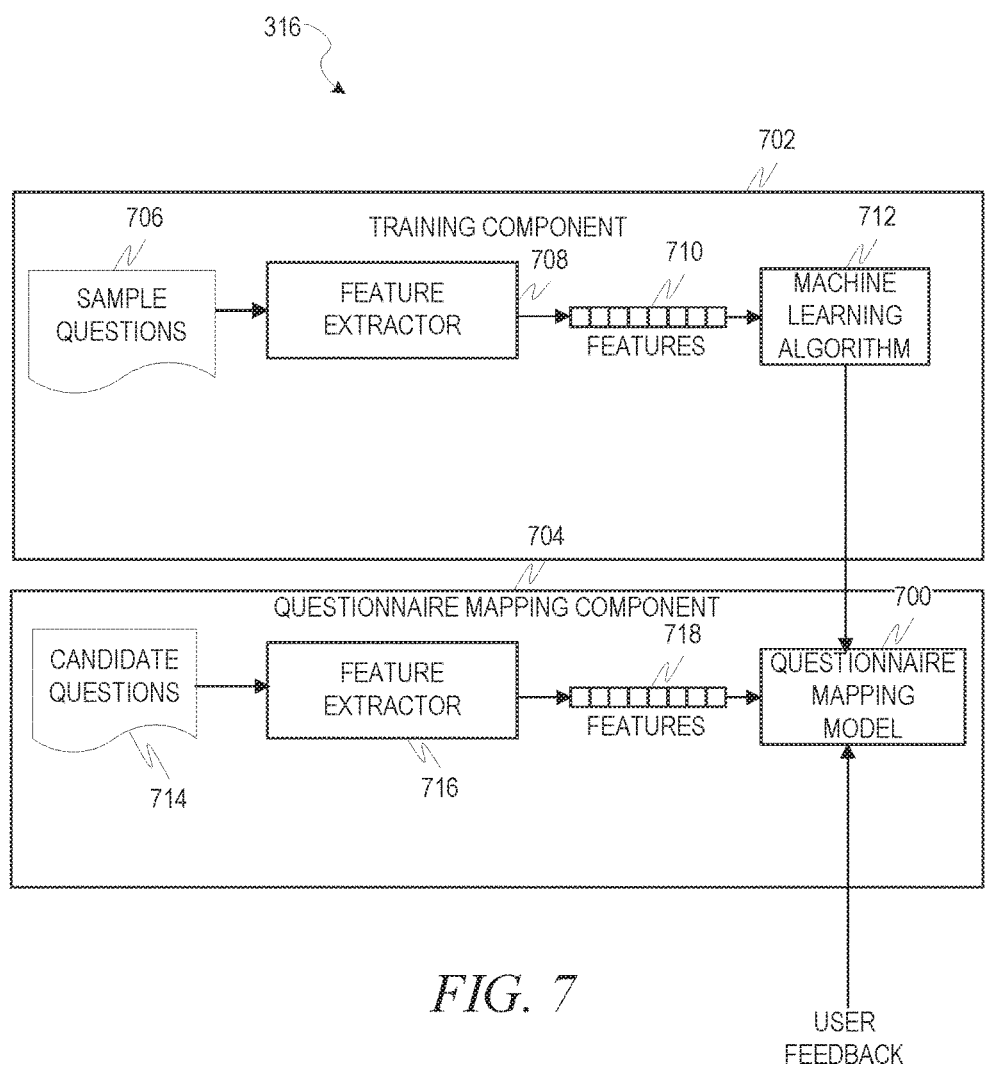
FIG. 7 is a block diagram illustrating a machine learning component used to automatically create information in a questionnaire mapping record, in accordance with an example embodiment.

In some example embodiments, the questionnaire mapping records 600 may be automatically created by the machine learning component 314. FIG. 7 is a block diagram illustrating a machine learning component 314 used to automatically create information in a questionnaire mapping record 600, in accordance with an example embodiment. It should be noted that this embodiment may be used in conjunction with, or in lieu of, the machine learning component 314 embodiment depicted in FIG. 5. Specifically, to the extent that the embodiment in FIG. 5 creates a normalized question corresponding to a particular questionnaire question, the mapping between the two may be automatically stored in a questionnaire mapping record. In some instances, however, there may be a need to map questionnaire questions to previously created normalized questions (such as those already created for other questionnaires). Additionally, once mapping has been performed, there is still the need to create any data transformation rules that are necessary. Here, the machine learning component 314 may utilize machine learning processes to arrive at a questionnaire mapping model 700 used to automatically create questionnaire mapping records 600 from raw format questionnaires. The machine learning component 314 may comprise a training component 702 and questionnaire mapping component 704. The training component 702 feeds sample questions 706 from sample questionnaires into a feature extractor 708 that extracts one or more features 710 for the sample questions 706. The sample questions may be labelled with normalized versions of the questions and data transformation rules. These features 710 are measurements useful in determining whether the sample questions 706 correlate to a previously created normalized question and/or determining whether data transformation rules are necessary. For example, the features 710 may include, for each sample question, HyperText Markup Language (HTML) element attributes such as class ID, label, and tag type. The features 710 are then fed into a machine learning algorithm 712, which acts to interpret the features as well as one or more labels provided by human administrators to learn how to identify which features of a question are relevant to determining a corresponding previously created normalized question and which features of a question are relevant to determining whether data transformation rules need to be used to change answers to the normalized question into a form required by the corresponding questionnaire question. The machine learning algorithm 712 produces the questionnaire mapping model 700. In the question mapping component 704, candidate questions 714 from questionnaires are fed to a feature extractor 716 that extracts one or more features 718 from the candidate questions 714. In an example embodiment, features 718 are identical to the features 710, although the values for the features will of course vary based on the questions. These features 718 are then fed to the questionnaire mapping model 700, which outputs a created questionnaire mapping record based on the model.

It should be noted that the questionnaire mapping model 700 may be periodically updated via additional training and/or user feedback. The user feedback may be either feedback from entities supplying the questionnaires (e.g., companies posting the job and preparing the questionnaires for members to complete), or from the members themselves. The feedback may include an indication about how successful the questionnaire mapping model 700 is in mapping questionnaire questions to normalized questions and generating data transformation rules needed to change answers to normalized questions into forms required by the corresponding questionnaire questions.

The machine learning algorithm 712 may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method.

While FIG. 6 depicts the mapping utilized by the field completion component 312, additional information is used to aid in automatically populating answers to the normalized questions. As described briefly above, a handling strategy field 408 may contain rules that are used to determine where to automatically extract data from and how to handle such data, as well as how to deal with circumstance where the data cannot be automatically extracted (for example, if there is no relevant profile data or other accessible pre-existing information containing the answer). FIG. 8 is a diagram illustrating example rules in a handling strategy field 408, in accordance with an example embodiment. This handling strategy field 408 may correspond to a normalized question asking for the member's last name. Since this information is likely to be contained in a member profile, a first rule 800 indicates that the field completion component 312 should retrieve information from a last name field in a profile corresponding to the member who is attempting to complete the application at runtime. This is an example of a data retrieval rule.

Data transformation rules may also be specified. For example, second rule 802 indicates that the field completion component 312 should check the number of characters in the retrieved information and truncate the retrieved information to 20 characters, which may represent a character limit for the answer. Data validity rules may also be specified. For example, third rule 804 indicates that the field completion component 312 should check the spelling of the retrieved information and, if the spelling does not match a name in a names database, interact with the easy apply front-end to ask the member, via a user interface, whether the retrieved information is correct. Conditional rules may also be specified. For example, fourth rule 806 provides another data retrieval rule that is only used if the first rule 800 was unsuccessful in retrieving information from the member profile. In such cases, the field completion component 312 may interact with the easy apply front-end 300 to request the answer directly from the user and then save that answer in the easy apply database 310 for future use. As such, the fourth rule 806 specifies that the easy apply database is checked to see if a previous answer to this question from this member has been saved and, if so, that previous answer is retrieved. A fifth rule 808 specifies that if no previous answer to this question from this member has been saved, then the easy apply front-end 300 is used to request an answer directly from the user, and this answer is saved in the easy apply database 310 for future use (e.g., when the member applies for another job requesting the same information).

It should be noted that there may be other locations from which the information to prepopulate the answers may be retrieved, other than a member's profile or the easy apply database. For example, in some rules, public records information or other online databases may be used to retrieve information.

Figure 9:
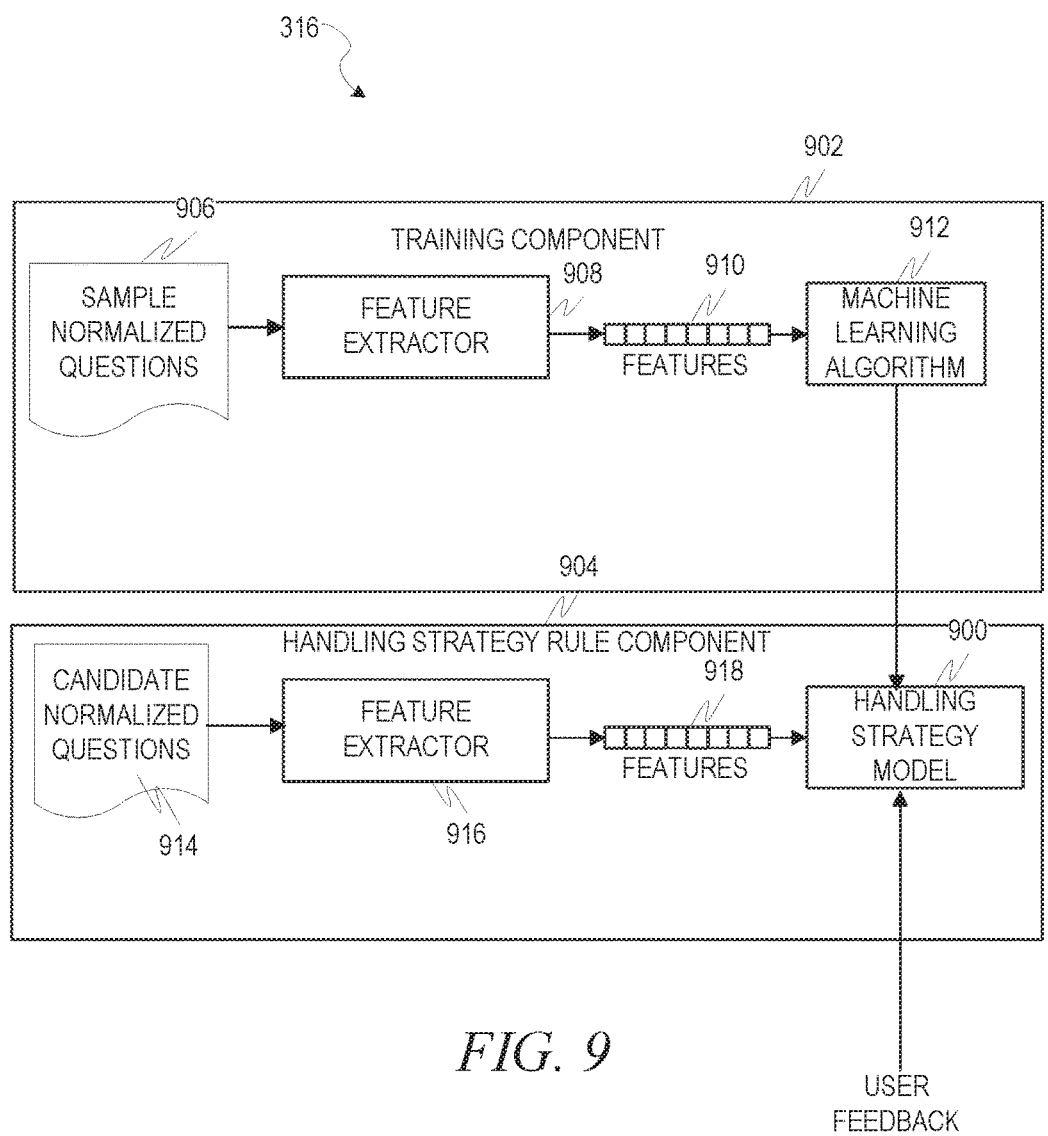
FIG. 9 is a block diagram illustrating a machine learning component used to automatically create rules in a handling strategy field of a normalized question record, in accordance with an example embodiment.

In some example embodiments, the rules in the handling strategy field 408 may be automatically created by the machine learning component 314. FIG. 9 is a block diagram illustrating a machine learning component 316 used to automatically create rules in a handling strategy field 408 of a normalized question record, in accordance with an example embodiment. It should be noted that this embodiment may be used in conjunction with, or in lieu of, any or all of the machine learning component 314 embodiments depicted in FIGS. 5 and 7. Here, the machine learning component 314 may utilize machine learning processes to arrive at a handling strategy model 900 used to automatically create rules for a handling strategy field 408 from normalized questions. The machine learning component 314 may comprise a training component 902 and handling strategy rule component 904. The training component 902 feeds sample normalized questions 906 into a feature extractor 908 that extracts one or more features 910 for the sample questions 906. The sample normalized questions 906 may be labelled with handling strategy rules for handling data to answer the sample normalized questions 906. These features 910 are measurements useful in determining rules useful in handling data to answer the sample normalized questions 906. For example, the features 910 may include, for each sample normalized question, HyperText Markup Language (HTML) element attributes such as class ID, label, and tag type. The features 910 are then fed into a machine learning algorithm 912, which acts to interpret the features as well as one or more labels provided by human administrators to learn how to identify which features of a normalized question are relevant to determining rules for handling data to answer the normalized question. The machine learning algorithm 912 produces the handling strategy model 900. In the question handling strategy rule component 904, candidate normalized questions 914 are fed to a feature extractor 916 that extracts one or more features 918 from the candidate normalized questions 914. In an example embodiment, features 918 are identical to the features 910, although the values for the features will of course vary based on the normalized questions. These features 918 are then fed to the handling strategy model 900, which outputs rules for use in a handling strategy field 408 from the corresponding normalized question records.

It should be noted that the handling strategy model 900 may be periodically updated via additional training and/or user feedback. The user feedback may be either feedback from entities supplying the questionnaires (e.g., companies posting the job and preparing the questionnaires for members to complete), or from the members themselves. The feedback may include an indication about how successful the handling strategy model 900 is in predicting and recommending handling strategy rules.

The machine learning algorithm 912 may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method.

Figure 10:
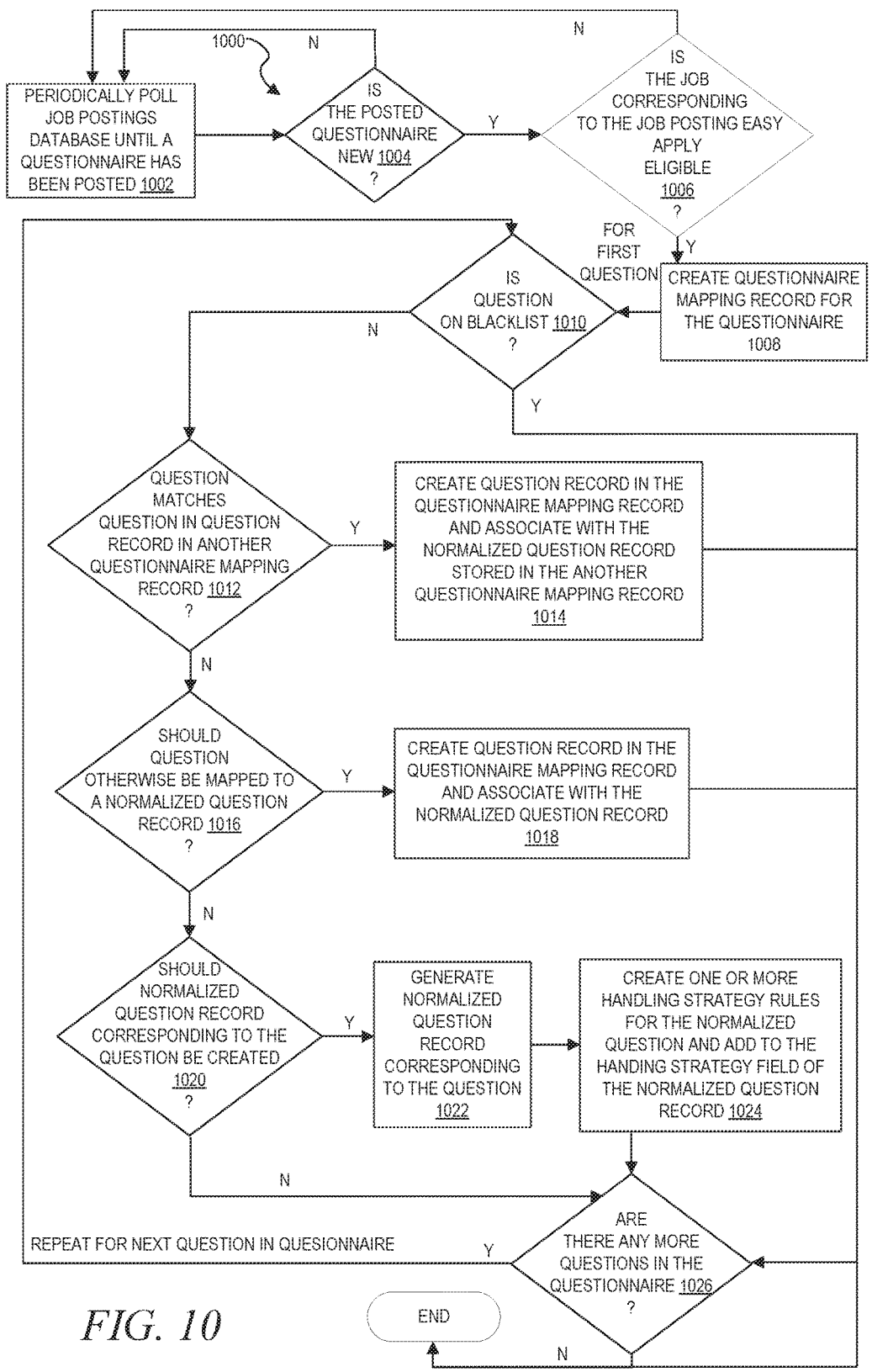
FIG. 10 is a flow diagram illustrating a method of handling a new questionnaire for a job posting, in accordance with an example embodiment.

FIG. 10 is a flow diagram illustrating a method 1000 of handling a new questionnaire for a job posting, in accordance with an example embodiment. This method 1000 may be executed, for example, by the question normalization component 308 when a new job is posted and a corresponding questionnaire for the job posting is made available. Of course, embodiments are not limited to running the method 1000 only when a new questionnaire is made available; in some instances, it may be desirable to run the method 1000 at other times. The overall goal of the method is to identify (and potentially create) normalized questions that correspond to questions in the questionnaire so that it will be easier to prepopulate answers to those questions when members apply for the job or otherwise attempt to complete the questionnaire. At operation 1002, a job postings database 306 is periodically polled until a questionnaire has been posted. At operation 1004, it is determined if the questionnaire is a new questionnaire (i.e., not previously processed by the question normalization component 308). If not, then the method 1000 may return to operation 1002. If so, the method may proceed to operation 1006, where it is determined if the job corresponding to the job posting is easy apply eligible. If not, the method 1000 may return to operation 1002. If so, then at operation 1008, a questionnaire mapping record is created for the questionnaire. Then a loop is begun for each question in the questionnaire, starting with the first question. At operation 1010, it is determined if the question is on a blacklist of questions. There may be certain questions that, for one reason or another, the system may wish to simply not create normalized question for. This may include, for example, questions that are illegal and/or violate privacy restrictions, such as requests for social security numbers, driver's license information, questions about religion, and the like. If so, then the process ends.

If not, then at operation 1012, it is determined if the question matches a question identified in a question record in another questionnaire mapping record in the easy apply database. If so, then it may be presumed that the question already has a matching question normalized. As such, at operation 1014 a question record is created in the questionnaire mapping record, with the question record including an identification of the question and an identification of a normalized question record. In this instance, the particular normalized question record of interest would be the one that was identified by the question record in the other questionnaire mapping record.

If at operation 1012 it is determined that the question does not match a question identified in a question record, there still may be a chance that there is a matching normalized question already stored in the easy apply database. This can occur in cases where the exact wording of the question does not match a previous question from a previous questionnaire, but the question still maps to the same normalized question as a previous question from a previous questionnaire. For example, if the only questionnaire question that has been previously mapped to a "Last Name" normalized question is one labelled "last name?". A new questionnaire may have a question labelled "surname?". Just because this question does not match the previous questionnaire's question of "last name" does not mean it does not map to the normalized question "last name". As such, at operation 1016, it is determined whether the question should be mapped to a normalized question record in the easy apply database. In some example embodiments, this may be performed by using a fixed algorithm, such as one that identifies common synonyms (e.g., surname=last name). In other example embodiments, the machine learning algorithm described earlier may be utilized.

If operation 1016 indicates that the question should be mapped to a normalized question record in the easy apply database, then the process may move to operation 1018 to create a question record and associate it with the normalized question record. In this case, the normalized question record of interest would be the one that operation 1016 determined it should be mapped to.

If operation 1016 determines that the question should not be mapped to a normalized question record, then at operation 1020, it is determined if a normalized question record corresponding to the question should be created. The determination here would be based on the likelihood that the question may be asked, even in a different form, by another questionnaire. In other words, it is determining whether the question could be considered generic (or semi-generic), as opposed to being unique. If the question is determined to be unique, then a normalized question record should not be created for it. There may be a number of different ways the system may determine whether a question is unique. In some example embodiments, a fixed algorithm is used to calculate a likelihood that the question is unique, using such factors as the presence of certain key words, the presence of completely unique and/or narrow words, and/or the similarity of the question to other questions in other questionnaires. In other example embodiments, the likelihood may be calculated using a machine learning algorithm, as described earlier. It should be noted that this machine learning algorithm may also output details about the exact normalized question to create for the questionnaire question, which is listed as a separate step below.

If it is determined at operation 1020 that a normalized question record corresponding to the question should be created, then at operation 1022, a normalized question record corresponding to the question is generated. In simple cases, this may involve using the exact wording of the question as a normalized question. In such embodiments, a possible additional process may be used to alter the wording of the normalized question when subsequent questions from subsequent questionnaires are mapped to the same normalized question. For example, in cases where the normalized question is generated from a question worded one way, the normalized question may be later modified to the way another question words the same general question (e.g., if a better way of wording the question is encountered, that better way of wording it replaces the earlier created version of the normalized question). In more complex cases, as described above, the machine learning algorithm may generate a new way of wording the same question that is "better," because it is worded in a clearer way or because it otherwise more represents a normalized version of the question.

At operation 1024, one or more handling strategy rules are created for the normalized question and added to a handling strategy field of the normalized question record. This process will be described in more detail below with respect to FIG. 11. At operation 1026, it is determined if there are any more questions in the questionnaire. If so, then the process loops back to operation 1010 If not, then the process may end.

Figure 11:
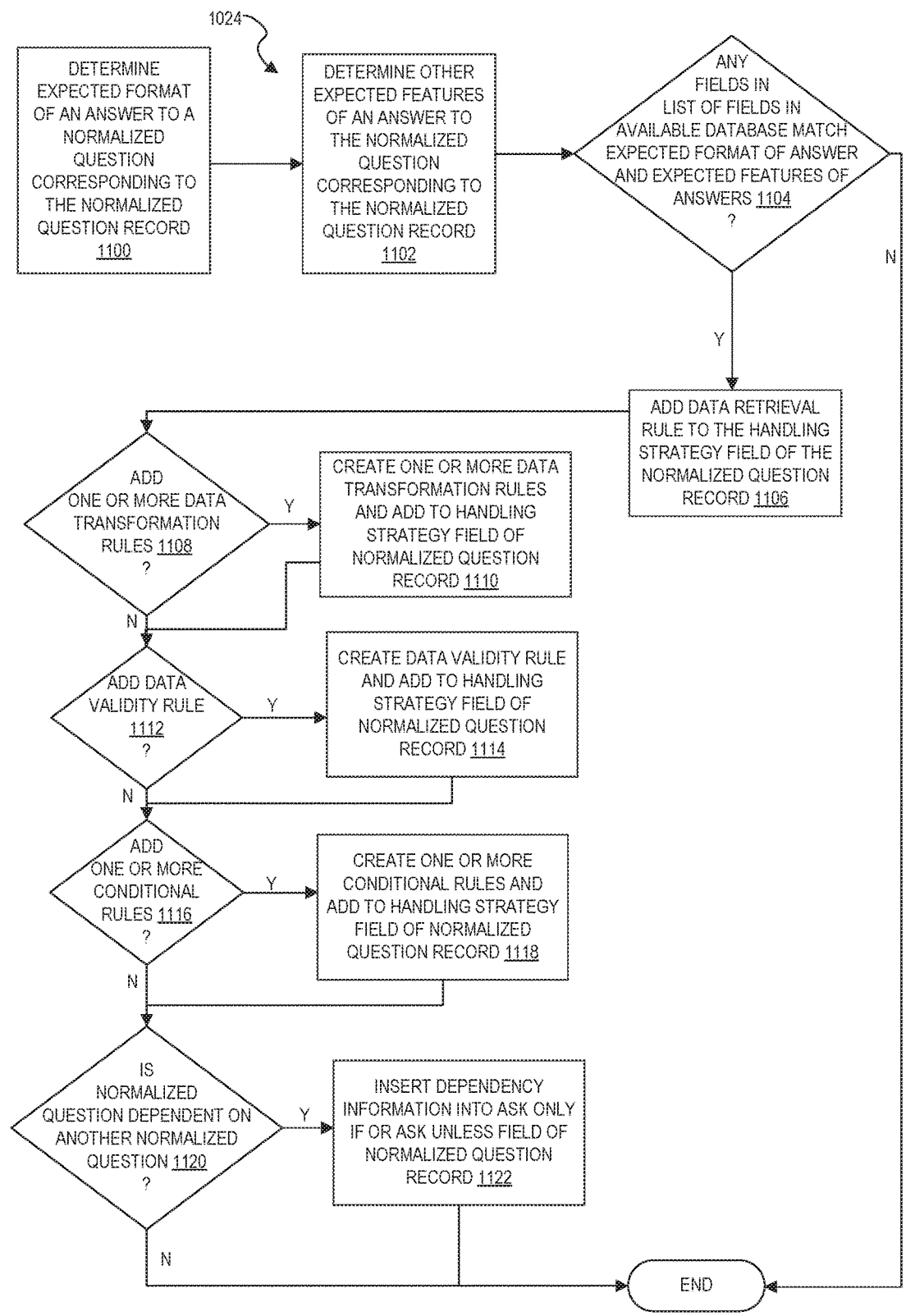
FIG. 11 is a flow diagram illustrating a method of creating one or more handling strategy rules and adding them to a handling strategy field of a normalized question record, in accordance with an example embodiment.

FIG. 11 is a flow diagram illustrating a method 1024 of creating one or more handling strategy rules and adding them to a handling strategy field of a normalized question record in accordance with an example embodiment. At operation 1100, the expected format of an answer to a normalized question corresponding to the normalized question record is determined. For example, operation 1100 may determine that the expected format of an answer to "last name?" is a string containing fewer than 20 characters. At operation 1102, one or more other expected features of an answer to the normalized question corresponding to the normalized question record are determined. This may include any features that may be helpful in determining what data to use to prepopulate an answer. For example, a feature of an expected answer to the "last name? question is that the answer is typically found near the answer to a "first name?" question. Another feature is that it commonly contains a name found somewhere in a social networking profile (a dictionary of last names may be precalculated, for example, from social networking profiles and maintained to perform such a check at runtime). At operation 1104, a list of fields in available databases is checked to determine if any fields match the expected format of the answer and the expected features of the answer. If so, then at operation 1106, a data retrieval rule is added to the handling strategy field of the normalized question record, with the handling strategy rule indicating that, at runtime, data should be retrieved from the identified field of the identified database. At operation 1108, it is determined if one or more data transformation rules should be added to the handling strategy field of the normalized question record. This may be determined by, for example, comparing formatting aspects (such as data type and size) of the field in the corresponding database with formatting aspects of the expected format of the answer. If so, then at operation 1110, one or more data transformation rules are created to convert the data from the identified field of the identified database into the expected format of the answer to the normalized question, and these data transformation rule(s) are added to the handling strategy field of the normalized question record. The creation of the data transformation rules may be performed by using a fixed algorithm preprogrammed to create transformation rules based on conditioning the data from a data source to an expected format for the answer, or may be derived via the machine learning algorithm processes described above.

At operation 1112, it is determined if a data validity rule should be added to the handling strategy field of the normalized question record. This may be determined by checking if the expected answer is of a type where validity of the data can be checked. For example, some types of personal information, such as age, date of birth, and so forth are more conducive to data validity checks then other types, such as reasons for applying for the job. There are, of course, many types of personal information that are something in between. For example, last name may be somewhat challenging to validate as there is no requirement that a last name be one that has ever been encountered before. To the same extent, some level of validity check may be desirable to be performed on data in a last name field, even if it is the "last name database lookup" operation described earlier, along with a prompt to a user to verify that the data is accurate if the last name data fails the validity check. The threshold for whether to include a data validity check, therefore, may be somewhat variable, whether set by an administrator or by a machine learning algorithm.

If it is determined at operation 1112 that a data validity rule should be added to the handling strategy field of the normalized question record, then at operation 1114, one or more data validity rules are created and added to the normalized question record. The creation of the data validity rules may be performed by using a fixed algorithm preprogrammed to create validity rules based on expectations for the types of answers that may be valid for different categories of questions, or may be derived via the machine learning algorithm processes described above.

At operation 1116, it may be determined if one or more conditional rules should be added to the handling strategy field of the normalized question record. It is likely (although not mandatory) that each normalized question record will have at least one conditional rule, even if it is only a condition rule indicating that if the data cannot be obtained from a database automatically then the user should be prompted to answer the question at runtime. There may be additional conditional rules that could be added, including, for example, checking alternative databases if the data cannot be obtained from a particular database (e.g., if the first name cannot be extracted from profile data, then a third party data source may be queried for the first name using other information from the profile data, such as date and place of birth, and current location). This may be determined by checking if the expected answer is of a type where validity of the data can be checked. If at operation 1116 it is determined that one or more conditional rules should be added to the handling strategy field of the normalized question record, then at operation 1118, one or more conditional rules are created and added to the handling strategy field of the normalized question record. The creation of the conditional rule(s) (as well as the determination about whether additional conditional rules should be added) may be performed by using a fixed algorithm preprogrammed to create conditional rules based on common databases used and expectations for the types of answers to be obtained for different categories of questions, or may be derived via the machine learning algorithm processes described above.

At operation 1120, it is determined if the normalized question is dependent on another normalized question. This determination may be performed in a number of different ways. In a first example embodiment, a preprogramed algorithm is used that defines certain normalized questions as inherently being dependent on other normalized questions. For example, if the question is related to any type of immigration information, the question is likely conditional on the member indicating that the member is not a U.S. citizen in response to a previous normalized question. In a second example embodiment, the questionnaires from which the normalized questions were derived or previously mapped from can be examined to determine if those questionnaires specify language indicating certain questions are conditional on answers to previous questions. An example of such language might include "if you answered . . . ," "if so," and "if not." In a third example embodiment, machine learning techniques may be used to determine if a question is dependent on another normalized question, such as by using training data of questions that are labelled as being dependent on other questions and extracting features from those questions that can be used to train a dependent question model used to automatically determine, at runtime, whether a particular normalized question is dependent on another. Of course, no matter the algorithm used, the algorithm may not only provide a determination in operation 1120 as whether the normalized question is dependent on another normalized question but may also provide the identification other normalized question from which the question depends. At operation 1122, this dependency information may then be stored in the normalized question record in either the ask only if field 414 or the ask unless field 416, depending upon whether the dependency is a positive one (ask the current question only if the previous question was answered in a particular way) or a negative one (ask the current question unless the previous question was answered in a particular way).

Figure 12:
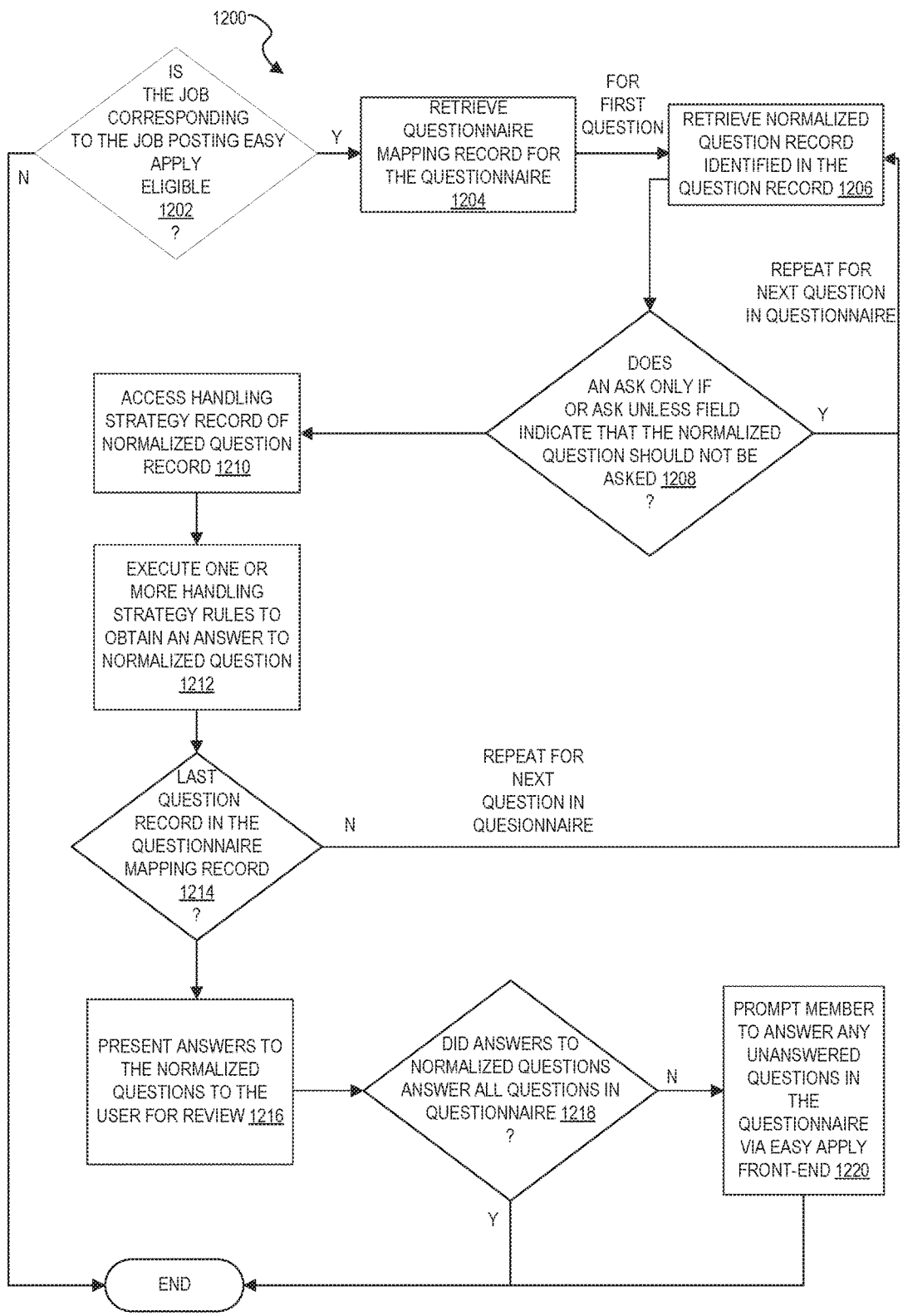
FIG. 12 is a flow diagram illustrating a method for performing easy apply for a questionnaire for a job posting, in accordance with an example embodiment.

FIG. 12 is a flow diagram illustrating a method 1200 for performing easy apply for a questionnaire for a job posting, in accordance with an example embodiment. This method 1200 may be performed at runtime when a user indicates a desire to use an easy apply process to complete a questionnaire (although it could also be performed without explicit request by the user). At operation 1202, it is determined if the job corresponding to the job posting is easy apply eligible. If not, the method 1200 may end. If so, then at operation 1204, a questionnaire mapping record for the questionnaire is retrieved from the easy apply database. As described above, the questionnaire mapping record may contain one or more question records. Then a loop is begun for each question record in the questionnaire mapping record, starting with the first question record. At operation 1206, a normalized question record identified in the question record is retrieved. At operation 1208, it is determined if an ask only if or ask unless field of the normalized question record indicates that the normalized question corresponding to the normalized question record should not be asked. This would occur if one of those fields indicated a dependency that was not satisfied, such as if an ask only if field indicated that the normalized question should be asked only if the member answered yes to a previous question and the member did not answer yes to that previous question. If it is determined that the normalized question should not be asked, then it is skipped and the process proceeds back to operation 1206 for the next question record in the questionnaire mapping record. If it is determined that those fields indicate no dependency or that a dependency exists but has been satisfied, then, at operation 1210, a handling strategy field of the retrieved normalized question record is accessed to obtain one or more handling strategy rules for execution. At operation 1212, the one or more handling strategy rules are executed to obtain an answer to the normalized question corresponding to the normalized question record. In many cases, as described above, if handling strategy rules are provided for a normalized question, then the information may be automatically retrieved from a database, such as a database of social networking service profiles. However, in some cases, the automatic retrieval does not work or is impossible, in which case the user may be prompted to manually enter the answer.

At operation 1214, it is determined if this is the last question record in the questionnaire mapping record, and if not, the process loops back up to operation 1206 for the next question record in the questionnaire mapping record. If so, however, then the process proceeds to operation 1216, where the answers provided to the normalized questions are presented to the user via the easy apply front-end for validation. Here, the user may review the answers (many of which are likely automatically populated) and indicate that it is permissible to send this information to the third party providing the questionnaire. At operation 1218, a determination is made as to whether the answers provided to the normalized questions answered all of the questions in the questionnaire. If not, then at operation 1220, the member is prompted to answer any unanswered questions in the questionnaire via the easy apply front-end.

Referring back to FIG. 3, the easy apply front-end 300 may be implemented in a number of different ways. In an example embodiment, the easy apply front-end 300 may be implemented as a web page executable by a web browser on a client device. Interaction with the easy apply front-end 300 causes a new web page to be generated and/or transmitted to a client device for execution in the browser. In another example embodiment, the easy apply front-end 300 may be implemented as part of a stand-alone application on a client device, such as a mobile device. In this embodiment, interaction with the easy apply front-end 300 causes information to be passed to and from the stand-alone application.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-12 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 13:
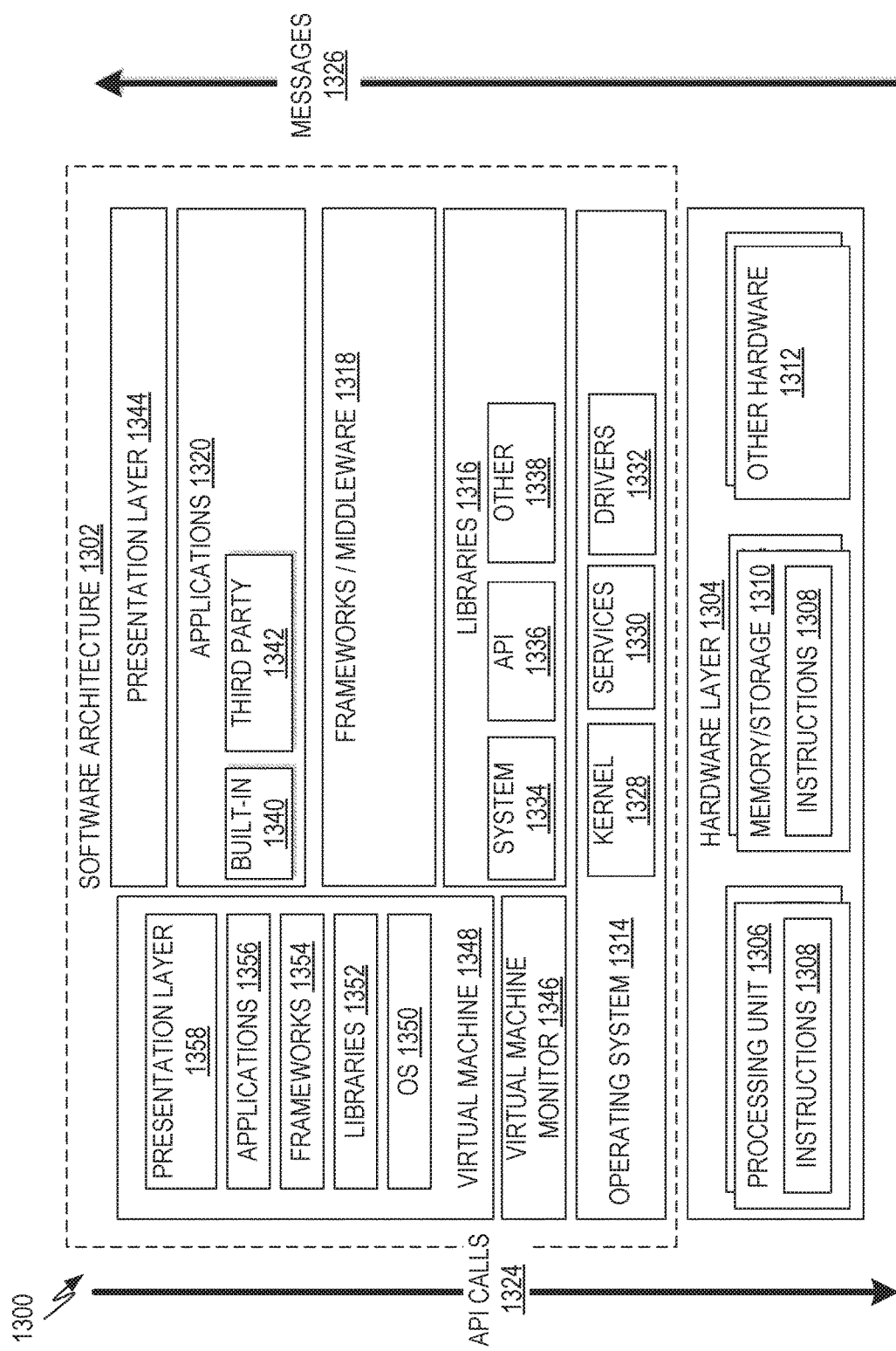
FIG. 13 is a block diagram illustrating a representative software architecture, which may be used in conjunction with various hardware architectures herein described.

FIG. 13 is a block diagram 1300 illustrating a representative software architecture 1302, which may be used in conjunction with various hardware architectures herein described. FIG. 13 is merely a non-limiting example of a software architecture, and it will be appreciated that many other architectures may be implemented to facilitate the functionality described herein. The software architecture 1302 may be executing on hardware such as a machine 1400 of FIG. 14 that includes, among other things, processors 1410, memory/storage 1430, and I/O components 1450. A representative hardware layer 1304 is illustrated and can represent, for example, the machine 1400 of FIG. 14. The representative hardware layer 1304 comprises one or more processing units 1306 having associated executable instructions 1308. The executable instructions 1308 represent the executable instructions of the software architecture 1302, including implementation of the methods, modules, and so forth of FIGS. 1-12. The hardware layer 1304 also includes memory and/or storage modules 1310, which also have the executable instructions 1308. The hardware layer 1304 may also comprise other hardware 1312, which represents any other hardware of the hardware layer 1304, such as the other hardware illustrated as part of the machine 1400.

In the example architecture of FIG. 13, the software architecture 1302 may be conceptualized as a stack of layers where each layer provides particular functionality. For example, the software architecture 1302 may include layers such as an operating system 1314, libraries 1316, frameworks/middleware 1318, applications 1320, and a presentation layer 1344. Operationally, the applications 1320 and/or other components within the layers may invoke API calls 1324 through the software stack and receive responses, returned values, and so forth, illustrated as messages 1326, in response to the API calls 1324. The layers illustrated are representative in nature and not all software architectures have all layers. For example, some mobile or special purpose operating systems may not provide a layer of frameworks/middleware 1318, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1316 may provide a common infrastructure that may be utilized by the applications 1320 and/or other components and/or layers. The libraries 1316 typically provide functionality that allows other software modules to perform tasks in an easier fashion than by interfacing directly with the underlying operating system 1314 functionality (e.g., kernel 1328, services 1330, and/or drivers 1332). The libraries 1316 may include system 1334 libraries (e.g., C standard library) that may provide functions such as memory allocation functions, string manipulation functions, mathematic functions, and the like. In addition, the libraries 1316 may include API 1336 libraries such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The frameworks 1318 (also sometimes referred to as middleware) may provide a higher-level common infrastructure that may be utilized by the applications 1320 and/or other software components/modules. For example, the frameworks 1318 may provide various graphic user interface (GUI) functions, high-level resource management, high-level location services, and so forth. The frameworks 1318 may provide a broad spectrum of other APIs that may be utilized by the applications 1320 and/or other software components/modules, some of which may be specific to a particular operating system or platform.

The applications 1320 include built-in applications 1340 and/or third party applications 1342. Examples of representative built-in applications 1340 may include, but are not limited to, a contacts application, a browser application, a book reader application, a location application, a media application, a messaging application, and/or a game application. The third party applications 1342 may include any of the built-in applications as well as a broad assortment of other applications. In a specific example, the third party application 1342 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1342 may invoke the API calls 1324 provided by the mobile operating system such as the operating system 1314 to facilitate functionality described herein.

The applications 1320 may utilize built-in operating system 1314 functions (e.g., kernel 1328, services 1330, and/or drivers 1332), libraries 1316 (e.g., system 1334, APIs 1336, and other libraries 1338), and frameworks/middleware 1318 to create user interfaces to interact with users of the system. Alternatively, or additionally, in some systems, interactions with a user may occur through a presentation layer, such as the presentation layer 1344. In these systems, the application/module "logic" can be separated from the aspects of the application/module that interact with a user.

Some software architectures utilize virtual machines. In the example of FIG. 13, this is illustrated by a virtual machine 1348. A virtual machine creates a software environment where applications/modules can execute as if they were executing on a hardware machine (such as the machine 1400 of FIG. 14, for example). A virtual machine is hosted by a host operating system (e.g., operating system 1314 in FIG. 13) and typically, although not always, has a virtual machine monitor 1346, which manages the operation of the virtual machine as well as the interface with the host operating system (e.g., operating system 1314). A software architecture executes within the virtual machine 1348, such as an operating system 1350, libraries 1352, frameworks/middleware 1354, applications 1356, and/or a presentation layer 1358. These layers of software architecture executing within the virtual machine 1348 can be the same as corresponding layers previously described or may be different.

Example Machine Architecture and Machine-Readable Medium

Figure 14:
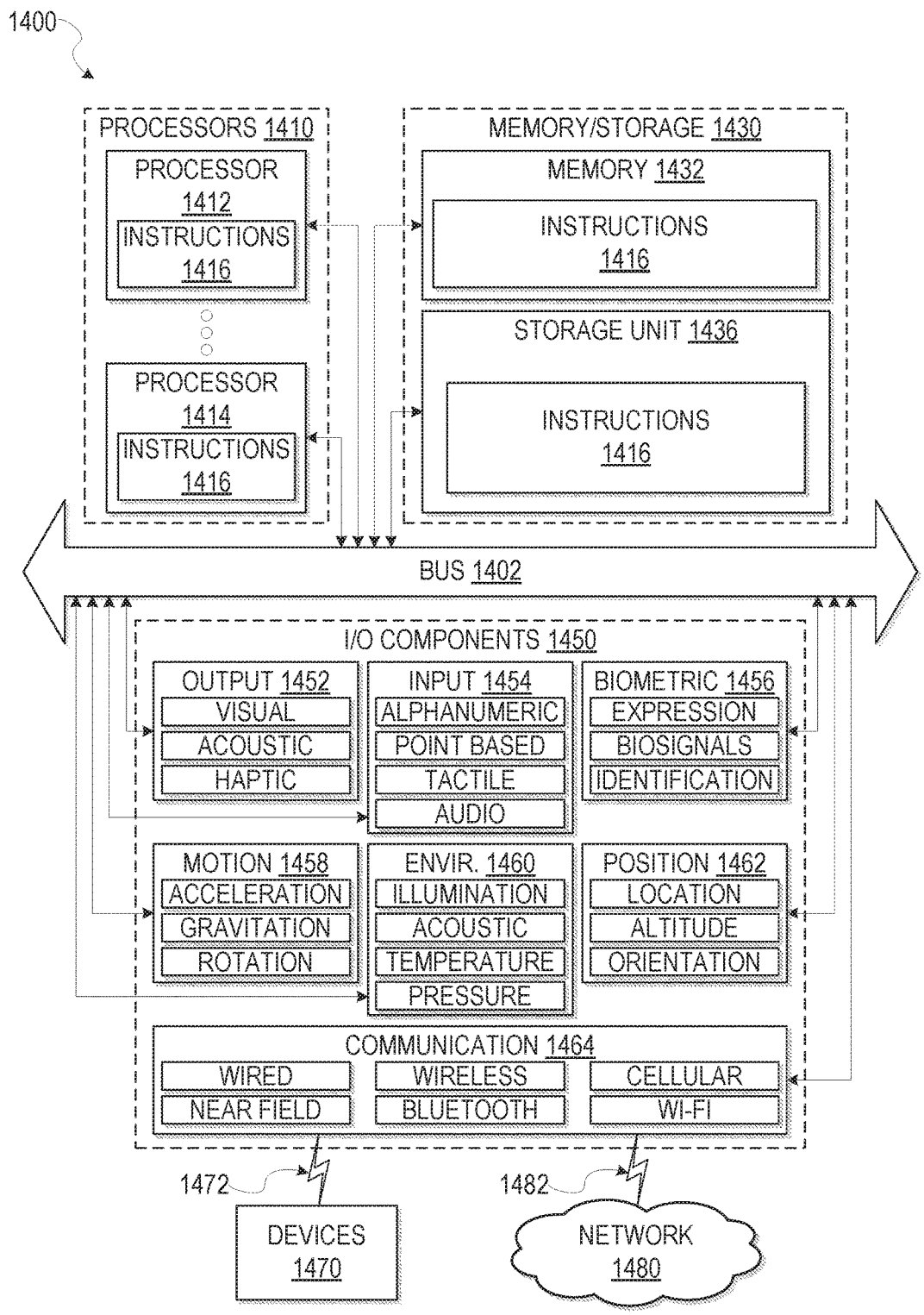
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. The instructions transform the general, non-programmed machine into a particular machine programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory/storage 1430, and I/O components 1450, which may be configured to communicate with each other such as via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1412 and a processor 1414 that may execute the instructions 1416. The term "processor" is intended to include multi-core processors that may comprise two or more independent processors (sometimes referred to as "cores") that may execute instructions contemporaneously. Although FIG. 14 shows multiple processors 1410, the machine 1400 may include a single processor with a single core, a single processor with multiple cores (e.g., a multi-core processor), multiple processors with a single core, multiple processors with multiples cores, or any combination thereof.

The memory/storage 1430 may include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor's cache memory), or any suitable combination thereof, during execution thereof by the machine 1400. Accordingly, the memory 1432, the storage unit 1436, and the memory of the processors 1410 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine (e.g., processors 1410), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462, among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or other suitable device to interface with the network 1480. In further examples, the communication components 1464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a USB).

Moreover, the communication components 1464 may detect identifiers or include components operable to detect identifiers. For example, the communication components 1464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1480 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., HTTP). Similarly, the instructions 1416 may be transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computerized method comprising:
receiving a computerized document containing one or more questions;
creating a first questionnaire mapping record corresponding uniquely to the computerized document;
for each question in the computerized document:
creating a question record corresponding uniquely to the question;
storing the question record corresponding uniquely to the question in the questionnaire mapping record;
determining if the question matches a question identified in a question record in a questionnaire mapping record, stored in a database, other than the first questionnaire mapping record;
in response to a determination that the question does not match a question identified in a question record in a questionnaire mapping record other than the first questionnaire mapping record:
determining if the question matches a normalized question stored in a normalized question record in the database, wherein a normalized question is a single canonical version of a question that has multiple versions;
in response to a determination that the question does not match a normalized question stored in a normalized question record in the database:
creating a normalized version of the question by selecting a single canonical version of the question;
creating a normalized question record corresponding uniquely to the normalized version of the question, the normalized question record containing the normalized version of the question;
inserting an identification of the normalized question record in the question record corresponding uniquely to the question in the questionnaire mapping record to create a mapping between the question record corresponding uniquely to the question and the normalized question record; and
storing one or more handling strategy rules in the normalized question record, the one or more handling strategy rules defining operations to automatically retrieve data to prepopulate an answer to a question in the computerized document corresponding to the first questionnaire mapping record and a question in a computerized document corresponding to a second questionnaire mapping record, based on the mapping, the one or more handling strategy rules being different than a second set of one or more handling rules stored in a second normalized question record, the second set of one or more handling rules defining operations to automatically retrieve data to prepopulate an answer to a question in a computerized document corresponding to a third questionnaire mapping record.

2. The method of claim 1, wherein the normalized question record is a separate binary large object (BLOB).

3. The method of claim 2, wherein the one or more handling strategy rules include an identification of one or more data sources from which to automatically retrieve the data to prepopulate an answer to the question.

4. The method of claim 2, wherein the one or more handling strategy rules include at least one data transformation operation for transforming data from the one or more data sources into a different format.

5. The method of claim 1, further comprising:
determining if the question is contained on a blacklist of restricted questions; and
wherein the creating, storing, and determining are performed in response to a determination that the question is not contained on a blacklist of restricted questions.

6. The method of claim 1, wherein the creating the normalized version of the question uses a machine learning algorithm process, the machine learning algorithm process comprising:
obtaining a plurality of sample questions from computerized documents;
for each sample question:
parsing the sample question to extract a first set of one or more features from the sample question;
feeding the extracted first set of features into a supervised machine learning algorithm to train a question normalization model based on the extracted first set of features;
parsing the question to extract a second set of one or more features; and
inputting the extracted second set of features into the question normalization model to generate a normalized question corresponding to the question.

7. The method of claim 6, wherein each of the plurality of sample questions includes a label indicating a normalized version of the corresponding sample question.

8. The method of claim 1, further comprising:
in response to a determination that the question matches a question identified in a question record in a questionnaire mapping record other than the first questionnaire mapping record:
obtaining an identification of a normalized question record stored in the questionnaire mapping record other than the first questionnaire mapping record; and
inserting the obtained identification of the normalized question record in the question record corresponding uniquely to the question in the questionnaire mapping record to create a mapping between the question record corresponding uniquely to the question and the normalized question record.

9. The method of claim 1, further comprising:
in response to a determination that the question matches a normalized question stored in a normalized question record in the database:
inserting an identification of the normalized question record in the question record corresponding uniquely to the question in the questionnaire mapping record to create a mapping between the question record corresponding uniquely to the question and the normalized question record.

10. A system comprising:
a non-transitory computer readable medium having instructions stored there on, which, when executed by a processor, cause the system to:
receive a computerized document containing one or more questions;
create a first questionnaire mapping record corresponding uniquely to the computerized document;
for each question in the computerized document:
create a question record corresponding uniquely to the question;
store the question record corresponding uniquely to the question in the questionnaire mapping record;

determine if the question matches a question identified in a question record in a questionnaire mapping record, stored in a database, other than the first questionnaire mapping record;

in response to a determination that the question does not match a question identified in a question record in a questionnaire mapping record other than the first questionnaire mapping record:

determine if the question matches a normalized question stored in a normalized question record in the database, wherein a normalized question is a single canonical version of a question that has multiple versions;

in response to a determination that the question does not match a normalized question stored in a normalized question record in the database:

create a normalized version of the question by selecting a single canonical version of the question;

create a normalized question record corresponding uniquely to the normalized version of the question, the normalized question record containing the normalized version of the question;

insert an identification of the normalized question record in the question record corresponding uniquely to the question in the questionnaire mapping record to create a mapping between the question record corresponding uniquely to the question and the normalized question record; and store one or more handling strategy rules in the normalized question record, the one or more handling strategy rules defining operations to automatically retrieve data to prepopulate an answer to a question in the computerized document corresponding to the first questionnaire mapping record and a question in a computerized document corresponding to a second questionnaire mapping record, based on the mapping, the one or more handling strategy rules being different than a second set of one or more handling rules stored in a second normalized question record, the second set of one or more handling rules defining operations to automatically retrieve data to prepopulate an answer to a question in a computerized document corresponding to a third questionnaire mapping record.

11. The system of claim 10, wherein the normalized question record is a separate binary large object (BLOB).

12. The system of claim 11, wherein the one or more handling strategy rules include an identification of one or more data sources from which to automatically retrieve the data to prepopulate an answer to the question.

13. The system of claim 11, wherein the one or more handling strategy rules include at least one data transformation operation for transforming data from the one or more data sources into a different format.

14. A non-transitory machine-readable storage medium comprising instructions, which when implemented by one or more machines, cause the one or more machines to perform operations comprising receiving a computerized document containing one or more questions;

creating a first questionnaire mapping record corresponding uniquely to the computerized document;

for each question in the computerized document:

creating a question record corresponding uniquely to the question;

storing the question record corresponding uniquely to the question in the questionnaire mapping record;

determining if the question matches a question identified in a question record in a questionnaire mapping record, stored in a database, other than the first questionnaire mapping record;

in response to a determination that the question does not match a question identified in a question record in a questionnaire mapping record other than the first questionnaire mapping record:

determining if the question matches a normalized question stored in a normalized question record in the database, wherein a normalized question is a single canonical version of a question that has multiple versions;

in response to a determination that the question does not match a normalized question stored in a normalized question record in the database:

creating a normalized version of the question by selecting a single canonical version of the question;

creating a normalized question record corresponding uniquely to the normalized version of the question, the normalized question record containing the normalized version of the question;

inserting an identification of the normalized question record in the question record corresponding uniquely to the question in the questionnaire mapping record to create a mapping between the question record corresponding uniquely to the question and the normalized question record; and storing one or more handling strategy rules in the normalized question record, the one or more handling strategy rules defining operations to automatically retrieve data to prepopulate an answer to a question in the computerized document corresponding to the first questionnaire mapping record and a question in a computerized document corresponding to a second questionnaire mapping record, based on the mapping, the one or more handling strategy rules being different than a second set of one or more handling rules stored in a second normalized question record, the second set of one or more handling rules defining operations to automatically retrieve data to prepopulate an answer to a question in a computerized document corresponding to a third questionnaire mapping record.

15. The non-transitory machine-readable storage medium of claim 14, wherein the normalized question record is a separate binary large object (BLOB).

16. The non-transitory machine-readable storage medium of claim 14, wherein the operations further comprise:

determining if the question is contained on a blacklist of restricted questions; and wherein the creating, storing, and determining are performed in response to a determination that the question is not contained on a blacklist of restricted questions.

17. The non-transitory machine-readable storage medium of claim 14, wherein the creating the normalized version of the question uses a machine learning algorithm process, the machine learning algorithm process comprising:

obtaining a plurality of sample questions from computerized documents;

for each sample question:

parsing the sample question to extract a first set of one or more features from the sample question;

feeding the extracted first set of features into a supervised machine learning algorithm to train a question normalization model based on the extracted first set of features;

parsing the question to extract a second set of one or more features; and inputting the extracted second set of features into the question normalization model to generate a normalized question corresponding to the question.

18. The non-transitory machine-readable storage medium of claim 17, wherein each of the plurality of sample questions includes a label indicating a normalized version of the corresponding sample question.

19. The non-transitory machine-readable storage medium of claim 14, wherein the operations further comprise:

in response to a determination that the question matches a question identified in a question record in a questionnaire mapping record other than the first questionnaire mapping record:

obtaining an identification of a normalized question record stored in the questionnaire mapping record other than the first questionnaire mapping record; and inserting the obtained identification of the normalized question record in the question record corresponding uniquely to the question in the questionnaire mapping record to create a mapping between the question record corresponding uniquely to the question and the normalized question record.

20. The non-transitory machine-readable storage medium of claim 14, wherein the operations further comprise:

in response to a determination that the question matches a normalized question stored in a normalized question record in the database:

inserting an identification of the normalized question record in the question record corresponding uniquely to the question in the questionnaire mapping record to create a mapping between the question record corresponding uniquely to the question and the normalized question record.

* * * * *